US006345960B1

(12) United States Patent
Persson et al.

(10) Patent No.: US 6,345,960 B1
(45) Date of Patent: Feb. 12, 2002

(54) APPARATUS FOR HIGH PRESSURE PUMPING OR HOMOGENIZING LIQUIDS

(75) Inventors: Richard Persson, Landsskrona; Claes-Goran Johansson, Loddekopinge, both of (SE)

(73) Assignee: Tetra Laval Holdings & Finance S.A., Pully (CH)

( * ) Notice: Subject to any disclaimer, the term of this patent is extended or adjusted under 35 U.S.C. 154(b) by 0 days.

(21) Appl. No.: 09/646,385

(22) PCT Filed: Mar. 17, 1999

(86) PCT No.: PCT/SE99/00417

§ 371 Date: Nov. 13, 2000

§ 102(e) Date: Nov. 13, 2000

(87) PCT Pub. No.: WO99/47811

PCT Pub. Date: Sep. 23, 1999

(30) Foreign Application Priority Data

Mar. 18, 1998 (SE) ................................................ 9800896

(51) Int. Cl.[7] .......................... F04B 23/00; F04B 39/00; F04B 53/00
(52) U.S. Cl. .................................... 417/313; 417/423.15
(58) Field of Search ................................. 417/313, 243, 417/423.15, 404; 426/289; 141/270

(56) References Cited

U.S. PATENT DOCUMENTS 4,168,727 A * 9/1979 Yoshida ...................... 141/270
4,333,729 A * 6/1982 Marugg ...................... 417/313
4,925,689 A * 5/1990 Getman ...................... 426/289
5,378,119 A   1/1995 Goertzen .................... 417/313
5,718,563 A   2/1998 Hutchinson .................. 417/32
5,772,408 A * 6/1998 Hada et al. .................. 417/313
5,934,883 A * 8/1999 Osterloff ..................... 417/313
6,017,200 A * 1/2000 Childs et al. ................ 417/404
6,022,200 A * 2/2000 Myers .................... 417/423.15
6,062,825 A * 5/2000 Chovan ...................... 417/243
6,220,825 B1 * 4/2001 Myers et al. ................ 417/313

* cited by examiner

Primary Examiner—Teresa Walberg
Assistant Examiner—Leonid M Fastovsky
(74) Attorney, Agent, or Firm—Burns, Doane, Swecker & Mathis, L.L.P.

(57) ABSTRACT

An apparatus for high pressure pumping or homogenizing of liquids has a drive motor with a transmission mechanism and a pump section. The transmission mechanism includes a belt train, a gearbox and a crank mechanism which is housed in a crankcase. The pump section includes a pump block, valves, and pistons which are connected to the crank mechanism. The transmission mechanism converts the rotary movement of the drive motor into the reciprocating movement of the pump pistons. The drive motor is placed directly above the crankcase and is surrounded on two sides by partitions which are interconnected by a roof. The partitions form, together with the roof, an air channel such that the driving parts of the apparatus may be cooled in a simple and efficient manner. By use of various arrangements peripheral to the apparatus, the air may be led off or recycled after cooling and recovery of the heat.

7 Claims, 4 Drawing Sheets

APPARATUS FOR HIGH PRESSURE PUMPING OR HOMOGENIZING LIQUIDS

TECHNICAL FIELD

The present invention relates to an apparatus for high pressure pumping or homogenizing liquids, and comprises a drive motor with transmission mechanism which consists of a belt train, a gearbox and crank mechanism, as well as a pump section with pump block, valves and pistons connected to the above-mentioned crank mechanism, the crank mechanism being housed in a crankcase.

BACKGROUND ART

A high pressure pump substantially consists of a powerful electric motor, a transmission mechanism comprising belt train, gearbox and crank mechanism, as well as a pump section with pump block, valves and a number of plungers or pistons. The crank mechanism is housed in a crankcase. The rotary movement of the electric motor is converted by means of the transmission mechanism into the reciprocating movement of the pistons. The high pressure pump moreover includes peripheral equipment, such as operating devices, pressure gauge, lubricating system and electric system.

A common field of application for a high pressure pump is as a homogenizer. In those cases when the high pressure pump is employed as a homogenizer, the pump block is supplemented with one or more homogenizer devices or counterpressure devices wherein the homogenization process proper takes place.

Homogenization is an industrial process that has long been in use and whose purpose is to finely divide particles in different types of liquids, for example in order to stabilise emulsions, to accentuate flavour and aroma, to impart better colour saturation in paints, and so on. A very common field of application is milk homogenization, whose purpose is to shear the largest fat globules occurring in the milk into smaller fat globules and by such means stabilise the fat emulsion, which prevents cream setting. The major proportion of all consumer milk today is homogenized.

Homogenization normally takes place in that, for example, a fat emulsion which may consist of milk is given a high input pressure which drives the emulsion at high speed through a very narrow throttle or gap where the fat globules of the fat emulsion are broken up, among other things as a result of the turbulence which occurs on a sudden pressure drop downstream of the homogenizer valve. The product which is to be homogenized is pressurized, often up to several hundred bar, by means of the high pressure pump and is forced to pass through a narrow throttle or gap in the counterpressure device. Given that liquid foods such as milk are often treated in a homogenizer, it is essential that a high standard of hygiene be maintained.

Most homogenizers occurring on the market are of similar construction. The components included in the homogenizer are integrated on a common frame and are enclosed in a casing. Above all the electric motor which acts as a prime mover for the homogenizer or high pressure pump generates considerable heat during operation. The transmission mechanism and the pump section also contribute in heat generation. As a result of the construction of the homogenizer, it has hitherto proved difficult to realise an efficient air cooling of the mechanisms and components included in it. During a lengthy operational period, more and more heat is generated inside the casing of the machine, which may finally lead to failure, because of the fact that the load-supporting capability of the oil in the bearings is reduced considerably with increasing ambient temperature. Nor have prior art constructions hitherto afforded any possibility of leading off or making use of the surplus heat.

In those cases when the homogenizer is sound-proofed, all components are enclosed in a common insulated housing or casing which entails that the entire casing must be insulated in compliance with those standards which are required for hygienic machinery, i.e. machines which are employed for handling foods. Prior art designs of machine concept and casing have also resulted in the various parts in a homogenizer being difficult to access for service.

OBJECTS OF THE INVENTION

One object of the present invention is, by a specific design and construction of the apparatus for high pressure pumping or homogenizing, to obtain a controlled and governed air cooling of the components included in the apparatus.

A further object of the present invention is to lead off, or alternatively recover the surplus heat which the components of the apparatus generate.

Yet a further object of the present invention is that the construction of the apparatus divides up the high pressure pump or homogenizer into a hygienic section and a drive section, with the result that the drive section may be sound-proofed in compliance with considerably lower standards than those required for hygienic machines.

SOLUTION

These and other objects have been attained according to the present invention in that the apparatus of the type described by way of introduction has been given the characterizing feature that the drive motor is placed above the crankcase and that the drive motor is surrounded on two sides by partitions which, together with an interconnecting roof, constitute an air channel.

Preferred embodiments of the present invention have further been given the characterizing features as set forth in the appended subclaims.

BRIEF DESCRIPTION OF THE ACCOMPANYING DRAWINGS

One preferred embodiment of the present invention will now be described in greater detail hereinbelow, with particular reference to the accompanying Drawings. In the accompanying Drawings.

The accompanying Drawings show only those details and parts essential to an understanding of the present invention.

Figure 1:
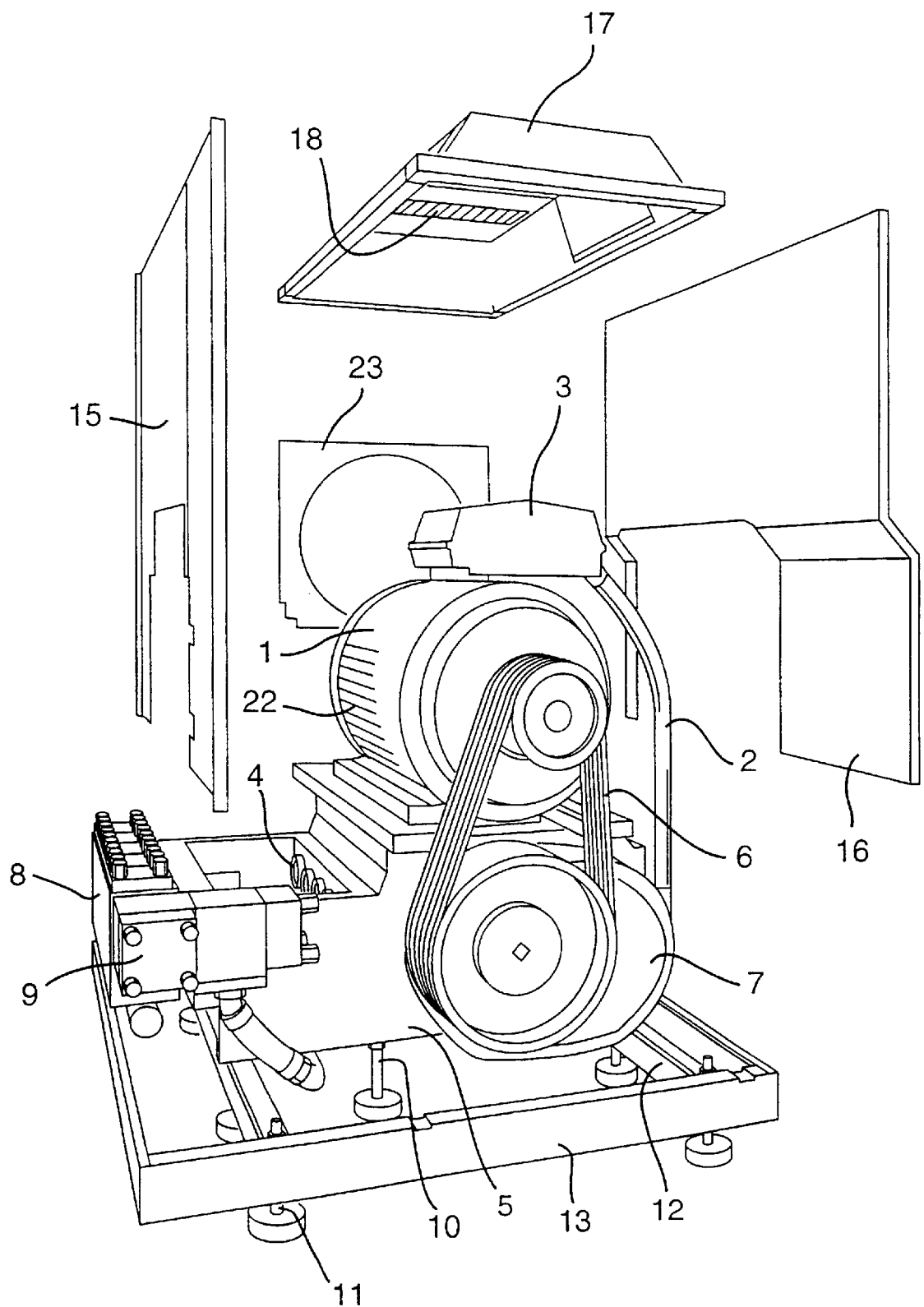
FIG. 1 is a partly exploded skeleton diagram of the apparatus according to the present invention.
Figure 2:
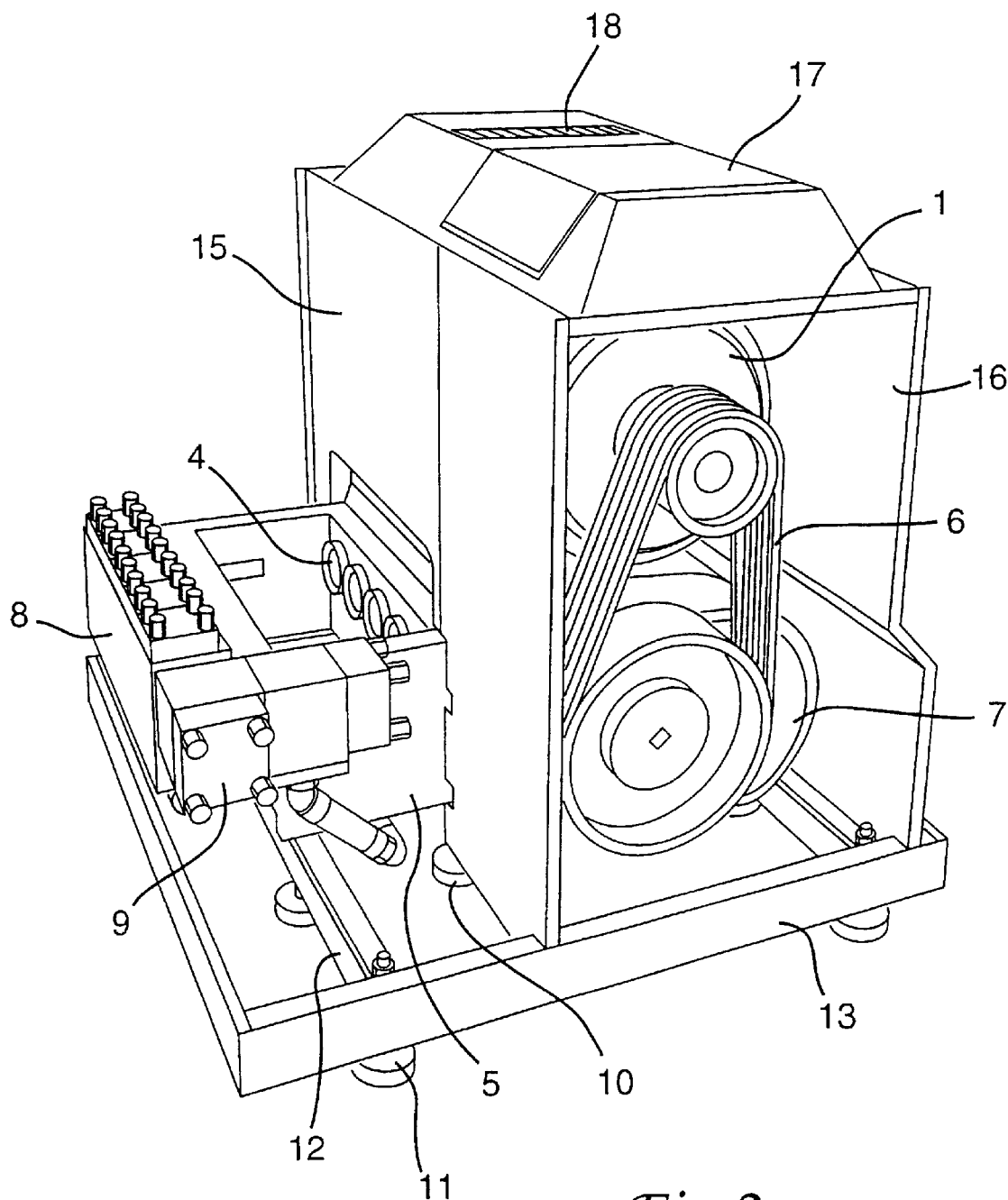
FIG. 2 is a skeleton diagram of the assembled apparatus according to the present invention.

In FIGS. 1 and 2, the apparatus according to the invention is shown with its basic components. In FIG. 1, certain of these components are dismantled, since they conceal other parts when assembled.

DESCRIPTION OF PREFERRED EMBODIMENT

The apparatus for high pressure pumping, i.e. a high pressure pump or alternatively a homogenizer, is driven by a powerful electric motor 1. The electric motor 1 is connected to a power source (not shown) by the intermediary of a cable line 2 from its protective terminal box 3.

The apparatus further includes a pump section which consists of a number of pump plungers or pistons 4 and a pump block 8. The pistons are disposed to reciprocate in cylinders. The pump pistons 4 are connected to a crank mechanism which is housed in a robust crankcase 5 preferably of cast iron. The number of pump pistons 4 and their diameter may vary depending upon the capacity and the pressure for which the apparatus is intended.

Between the electric drive motor 1 and the pump section, there is disposed a transmission mechanism which substantially consists of one or more drive belt trains 6, a gearbox 7 and the above-mentioned crank mechanism. The transmission mechanism caters for the conversion of the rotary movement of the drive motor 1 into the reciprocating movement of the pump pistons 4.

If the apparatus for high pressure pumping is employed as a homogenizer, one or more counterpressure devices or homogenizer valves 9 are connected to the pump block 8, in which devices or valves the homogenization process proper takes place, in that the product is forced under high pressure to pass through a very narrow throttle or gap.

The apparatus according to the present invention is designed such that the powerful, specifically designed crankcase 5 constitutes the frame of the apparatus and that the carrying support legs 10 are screwed directly into the crankcase 5. The purpose of the other support legs 11 which are screwed into beams 12 is to ensure that the machine stands stably without the risk of any instability. The apparatus is framed by profiles 13 in which outer protective plates 14 may be secured. The outer protective plates 14 surround and protect the machine during operation. The protective plates 14 are suitably openable for simple access when, for example, the machine is to be serviced.

The electric motor 1 is placed direct on the specifically designed crankcase 5 and is supported by the crankcase 5. This gives a compact construction to the entire high pressure pump or homogenizer and the result will be a machine which takes up less floor space than conventionally designed and constructed machines. On two sides of the electric motor 1, the motor is surrounded by two partitions 15 and 16. The two partitions are interconnected by means of a roof 17 and a plate beneath the machine which forms a channel 24. The roof 17 may constitute an anchorage for any possible outer casing for specific applications of the apparatus. By varying the size and shape of the roof 17, different casings may be employed.

The front partition 15 separates off the driving parts, i.e. the motor and the transmission mechanism of a homogenizer or high pressure pump from the hygienic parts, i.e. those parts where the product passes. Given that the homogenizer is separated in such a manner, the space where the driving parts are located may be sound-proofed and insulated in compliance with considerably lower standards that those which were previously necessary when all components included in the homogenizer were housed in the same space. The driving parts in a homogenizer or a high pressure pump are moreover those parts of the machine which generate the greater part of the noise emitted by the machine. Moreover, hygienic absorbents suffer from the drawback of being expensive, of displaying poor resistance to mechanical action, and of a lower level of performance as regards sound-insulating function.

The two partitions 15, 16 may, for example, be manufactured from chequered aluminium plate. By turning the uneven sides of the chequered plate towards the motor 1, a reflection of the sound waves will be obtained in all possible directions. Since the sound waves lose energy on each change of direction, this contributes to some degree in the sound insulation of the drive section. Furthermore, the chequered aluminium plate is an economical material, nor does it suffer from the disadvantage of reflecting light and thereby causing dazzling, which stainless steel may do.

The partitions 15 and 16 furthermore serve as anchorage points for the peripheral equipment of the apparatus, such as lubrication unit, coupling boxes, alarm panel and wiring. As a result of the placing of the partitions 15 and 16 closely adjacent the motor 1, surrounding it on two sides and extending out to the one outer protective plate 14 of the machine, it will not either be necessary to provide the belt train 6 with a specific belt guard.

Figure 3:
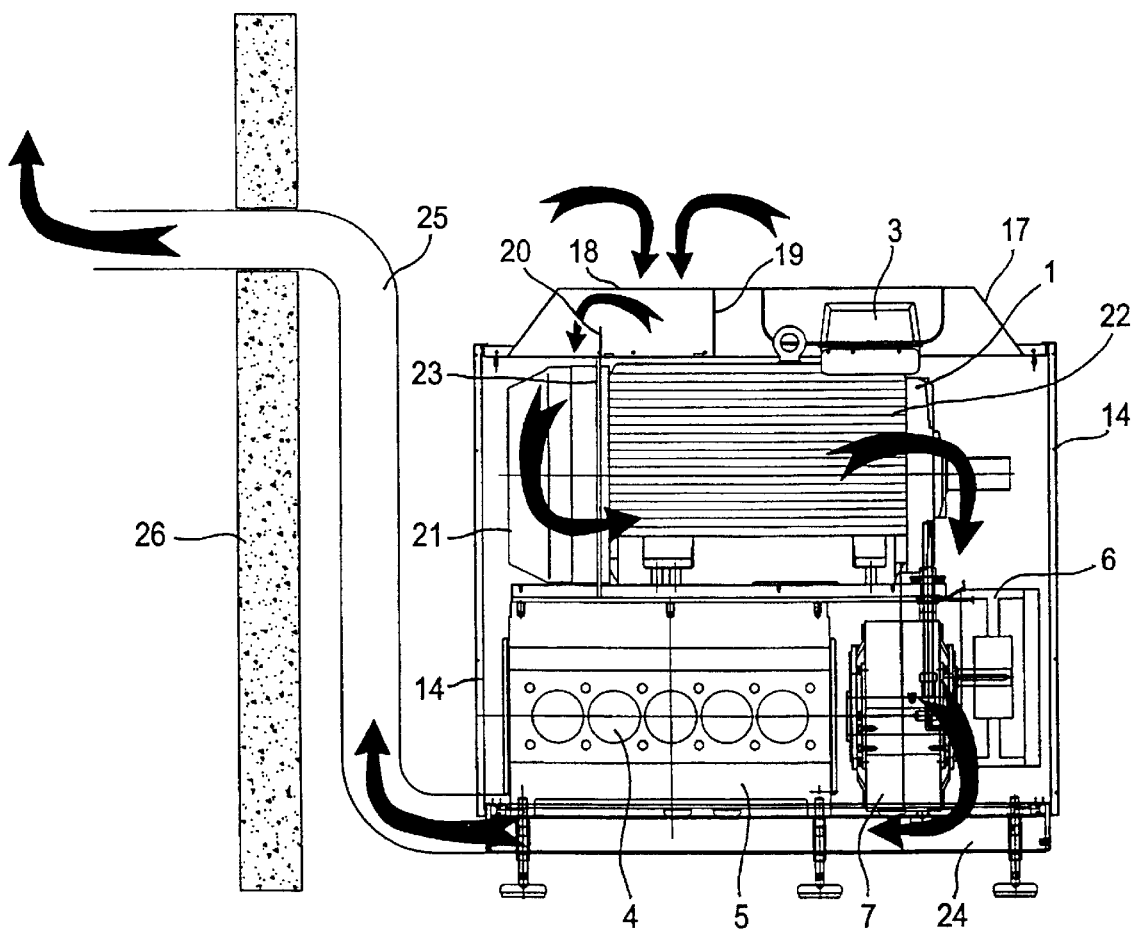
FIG. 3 is a side elevation, partly in section, of the apparatus according to the present invention, with air cooling according to a first embodiment.
Figure 4:
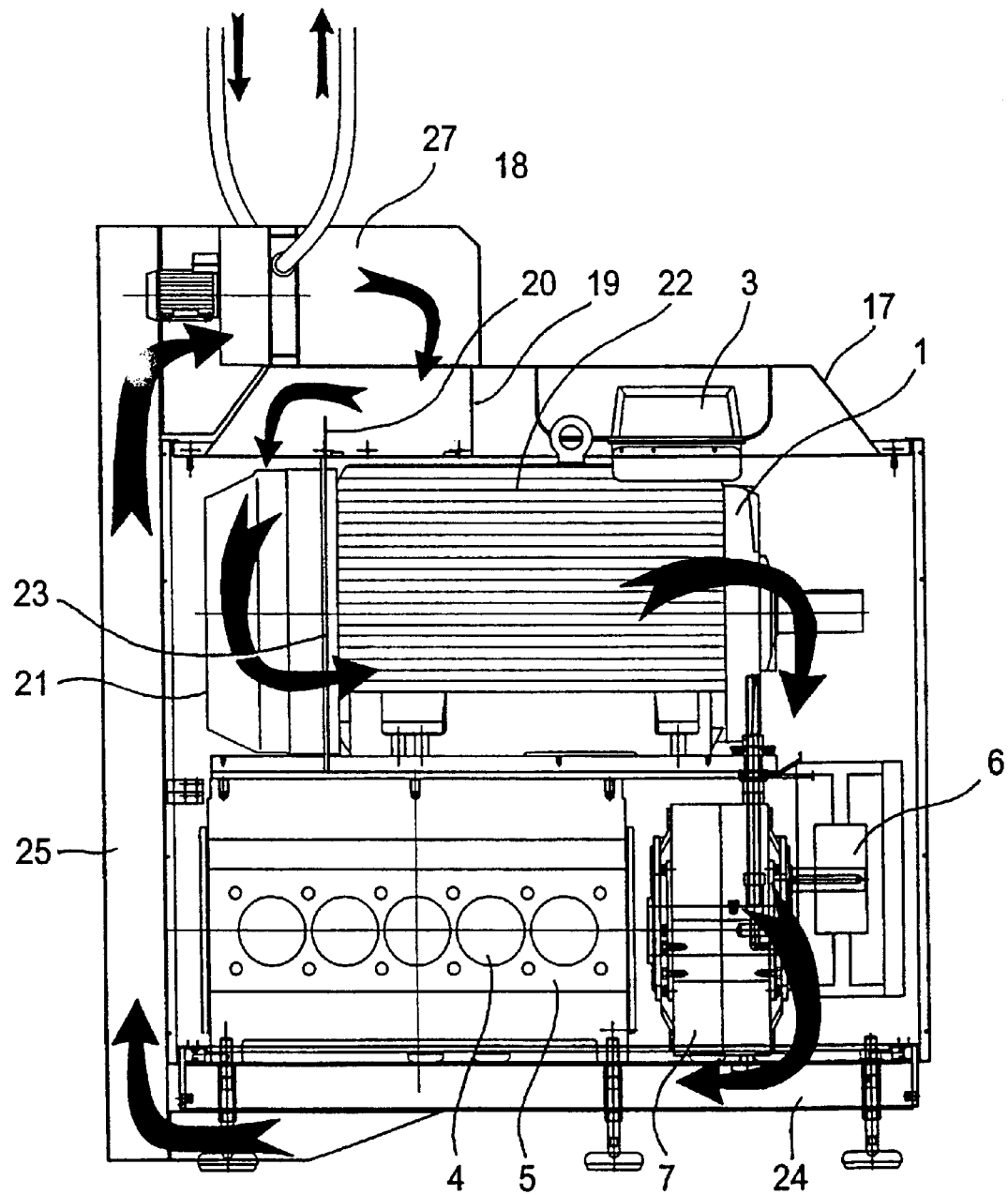
FIG. 4 is a side elevation, partly in section, of the apparatus according to the present invention, with air cooling according to a second embodiment.

The two partitions 15 and 16, and the roof 17 together form an air channel which surrounds the motor 1. The air channel is defined in both of its short ends by the protective plate 14. In FIGS. 3 and 4, arrows show the path taken by the air in the drive section of the apparatus so that an effective and simple air cooling of the heat-generating components in the apparatus will be obtained.

Air passes into the apparatus, a high pressure pump or a homogenizer, through an air intake 18 in the roof 17. The air is guided through a guide plate 19 placed in the roof 17, whereafter the air passes a labyrinth plate 20 and is forced down towards the suction side 21 of the motor 1. The guide plate 19 and the labyrinth plate 20 moreover prevent direct splashing of water on the motor 1 and the terminal box 3, given that in, for example, a dairy environment, use is readily made of cleaning lye in the form of foam, followed by direct rinsing of the machines using water at high pressure.

On the suction side 21 of the motor 1, the air is sucked in by the fan impeller of the motor 1 and is pressurised. The air is thereafter caused to pass along the cooling flanges 22 of the motor 1 and, in such instance, the air also passes on the upper side of the crankcase 5. The air is forced in through the fan impeller of the motor 1 because other routes are blocked by a plate 23 which is sealed off against the motor 1. After having passed the motor 1, the air is forced by the protective plate 14 to move downwards and on its way passes the transmission mechanism, belt train 6 and gearbox 7 of the apparatus. Thereafter, the air passes into the channel 24 beneath the crankcase 5 and cools the underside of the crankcase 5.

As shown in FIG. 3, an air duct 25 may be connected to the channel 24 beneath the crankcase 5, the air duct leading off the air away from the apparatus and out from the premises where the apparatus is located, in that air duct 25 passes through a wall 26. Alternatively, the air duct 25 may be returned to the apparatus in that it is caused to pass a conventional air cooler 27 as shown in FIG. 4, which may be air cooled, or alternatively water cooled. After cooling in the air cooler 27, the air may be recycled and pass once again in through the air intake 18 of the roof 17. By transferring airborne loss effects which, for a large machine, may amount to approx. 20 kW, to circulating water in the cooler 27, there is the possibility of taking care of this energy which is normally a loss, for example by means of a heat pump. Another advantage which is attained using this procedure is that a high pressure pump or homogenizer built according to the present invention does not make any contribution in raising the ambient temperature in the factory premises, which is often a major problem.

Most high pressure pumps and homogenizer have a degree of efficiency in the drive section of less than 90 per cent. By recovering the lost energy as described above, the degree of efficiency may be raised to 98–99 per cent.

As will have been apparent from the foregoing description, the present invention realises an apparatus for high pressure pumping or homogenizing, which, as a result of the particular design and placing of the components, does not require a special frame and which displays a compact construction occupying little floor space. As a result of the partitions and the roof which interconnects them, an air channel will be obtained which is used for efficiently cooling the drive section of the apparatus. After passage through the apparatus, the air may either be led off or be recycled after cooling.

The present invention should not be considered as restricted to that described above and shown on the Drawings, many modifications being conceivable without departing from the scope of the appended Claims.

What is claimed is:

1. An apparatus for high pressure pumping or homogenizing liquids, comprising a drive motor (1) with transmission mechanism, said transmission mechanism consisting of a belt train (6), a gearbox (7) and crank mechanism, as well as a pump section with pump block (8), valves and pistons (4) connected to said crank mechanism, said crank mechanism being housed in a crankcase (5), characterized in that the drive motor (1) is placed above the crankcase (5); and that the drive motor (1) is surrounded on two sides by partitions (15, 16), said partitions (15, 16), together with an interconnecting roof (17), constituting an air channel.

2. The apparatus as claimed in claim 1, characterized in that the apparatus comprises a homogenizer in that a counterpressure device (9) is connected to the pump section.

3. The apparatus as claimed in claim 1, characterized in that the air channel is defined in both its short ends by protective plates (14); and that a route for coolant air is formed from an air intake (18) in the roof (17), via a guide plate (19) and a guide plate (23), said route being terminated by means of a channel (24) beneath the crankcase (5).

4. The apparatus as claimed in claim 3, characterized in that the channel (24) beneath the crankcase (5) is connected to an air duct (25) in which the air is led away from the apparatus.

5. The apparatus as claimed in claim 3, characterized in that the channel (24) beneath the crankcase (5) is connected to an air duct (25) in which air is led to a cooler (27) and thereafter back to the air intake (18).

6. The apparatus as claimed in claim 1, characterized in that the crankcase (5) is designed such that it constitutes the frame of the apparatus.

7. The apparatus as claimed in claim 2, characterized in that the one partition (15) divides the homogenizer into a drive section and a hygienic section.

* * * * *